United States Patent
Liu et al.

(10) Patent No.: US 11,940,898 B2
(45) Date of Patent: Mar. 26, 2024

(54) DYNAMIC TRACING OF RUNTIME DATA IN A DISTRIBUTED SYSTEM

(71) Applicant: VMware, Inc., Palo Alto, CA (US)

(72) Inventors: Jin Liu, Beijing (CN); Caixia Jiang, Beijing (CN); Qiong Wang, Beijing (CN); Donghai Han, Beijing (CN)

(73) Assignee: VMware, Inc., Palo Alto, CA (US)

( * ) Notice: Subject to any disclaimer, the term of this patent is extended or adjusted under 35 U.S.C. 154(b) by 1 day.

(21) Appl. No.: 17/527,188

(22) Filed: Nov. 16, 2021

(65) Prior Publication Data

US 2023/0153224 A1 May 18, 2023

(51) Int. Cl.
*G06F 11/00* (2006.01)
*G06F 11/07* (2006.01)
*G06F 11/34* (2006.01)

(52) U.S. Cl.
CPC ...... *G06F 11/3495* (2013.01); *G06F 11/0709* (2013.01); *G06F 11/0751* (2013.01)

(58) Field of Classification Search
CPC ............ G06F 11/0709; G06F 11/0751; G06F 11/3089; G06F 11/3495
See application file for complete search history.

(56) References Cited

U.S. PATENT DOCUMENTS

| | | | | |
|---|---|---|---|---|
| 9,223,681 B2* | 12/2015 | Delporte | ............ | G06F 11/3604 |
| 9,417,993 B2* | 8/2016 | Gataullin | ............ | G06F 11/3003 |
| 11,163,624 B2* | 11/2021 | Colgrove | ............ | G06F 11/3072 |
| 2011/0067008 A1* | 3/2011 | Srivastava | .......... | G06F 11/3466 |
| | | | | 717/128 |
| 2017/0168914 A1* | 6/2017 | Altman | ............... | G06F 11/3495 |
| 2018/0107502 A1* | 4/2018 | Shang | ..................... | H04L 43/10 |
| 2018/0217888 A1* | 8/2018 | Colgrove | ............ | G06F 11/3034 |
| 2018/0307579 A1* | 10/2018 | Rothchilds | .......... | G06F 11/3065 |
| 2020/0356433 A1* | 11/2020 | Kumar | ................ | G06F 11/0787 |
| 2021/0081271 A1* | 3/2021 | Doshi | ................. | G06F 11/0772 |

* cited by examiner

*Primary Examiner* — Elmira Mehrmanesh
(74) *Attorney, Agent, or Firm* — King Intellectual Asset Management (57) ABSTRACT

An administrator agent and local worker agents are provided in nodes of a distributed system to support dynamic tracing of runtime data. Trace profiles are associated with the nodes on which the local worker agents reside. The local worker agents monitor the runtime data for an error, and the administrator agent adjusts the trace profile(s) in response to the error(s). The administrator agent sends the adjusted trace profile(s) to the local worker agents, so as to enable trace output data of traces performed by the nodes to be increased or decreased.

15 Claims, 4 Drawing Sheets

DYNAMIC TRACING OF RUNTIME DATA IN A DISTRIBUTED SYSTEM

BACKGROUND

Unless otherwise indicated herein, the approaches described in this section are not admitted to be prior art by inclusion in this section.

Virtualization allows the abstraction and pooling of hardware resources to support virtual machines in a software-defined networking (SDN) environment, such as a software-defined data center (SDDC). For example, through server virtualization, virtualized computing instances such as virtual machines (VMs) running different operating systems (OSs) may be supported by the same physical machine (e.g., referred to as a host). Each virtual machine is generally provisioned with virtual resources to run an operating system and applications. The virtual resources may include central processing unit (CPU) resources, memory resources, storage resources, network resources, etc.

Virtualized computing environments may be implemented as distributed systems, such as a distributed storage system; a hyperconverged infrastructure (HCI) environment, which combines elements of a traditional data center: storage, compute, networking, and management functionality; a network virtualization platform; or other type of distributed system in which physical and/or virtual network devices (including subcomponents thereof) are arranged in a distributed manner across the system.

Problems while operating distributed systems can sometimes be addressed (e.g., via root cause analysis) using logs and command line interface (CLI) outputs. However, some problems in a large distributed system may be very difficult to identify using root cause analysis, such as where an error originates, due to lateness of a response that shows the error, no exception being recorded in a log file, etc.

Tracing techniques are sometimes used in distributed systems to identify/diagnose issues. However, current tracing techniques are sometimes ineffective or inefficient. For instance, trace output data may be inadequate for identifying the issues, or the trace output data may be large, thereby requiring additional resources (e.g., additional storage and processing/analysis systems) to handle the trace output data. Trace processing may also cause performance concerns when executed for currently running systems.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. The aspects of the present disclosure, as generally described herein, and illustrated in the drawings, can be arranged, substituted, combined, and designed in a wide variety of different configurations, all of which are explicitly contemplated herein.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, such feature, structure, or characteristic may be implemented in connection with other embodiments whether or not explicitly described.

The present disclosure describes techniques to improve the efficiency/performance of traces in a distributed system. Tracing may be performed dynamically during runtime of the distributed system, and the techniques described herein enable the increase or decrease of the level of detail of the trace output data as needed, without having to additionally allocate substantial further storage/analysis resources to process the trace output data.

The techniques described herein use a coordinator system, which includes an administrator agent and local worker agents. The administrator agent may be elected, and may reside at a network device (a node) in the distributed system. The local worker agents may also reside at respective network devices (other deployed nodes) in the distributed system. The administrator agent of various embodiments is responsible for managing (including updating/adjusting) the trace profile that is applied to the deployed nodes, based on runtime data and other data provided to the administrator agent by one or more of the local worker agents.

Computing Environment

In some embodiments, the techniques disclosed herein may be provided in and for a virtualized computing environment or other type of distributed system. In other embodiments, the techniques disclosed herein to support tracing may be provided in and for other types of computing environment (which may not necessarily involve a virtualized computing environment). For the sake of illustration and explanation, the various embodiments will be described below in the context of a distributed system such as a virtualized computing environment for a network virtualization platform.

Figure 1:
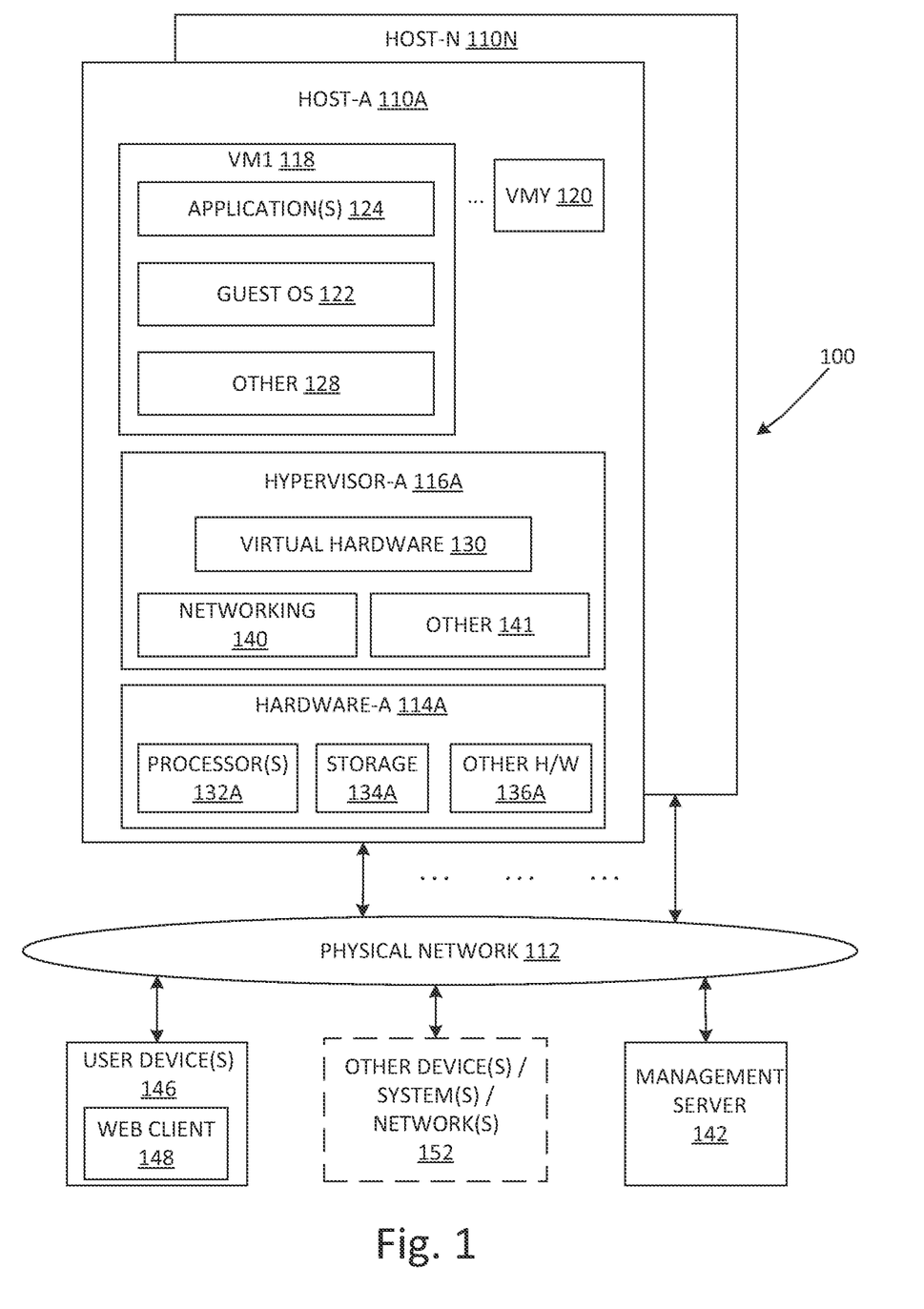
FIG. 1 is a schematic diagram illustrating an example virtualized computing environment in which dynamic tracing of runtime data may be implemented.

For instance, FIG. 1 is a schematic diagram illustrating an example virtualized computing environment 100 in which dynamic tracing of runtime data may be implemented. Depending on the desired implementation, the virtualized computing environment 100 may include additional and/or alternative components than that shown in FIG. 1.

In the example in FIG. 1, the virtualized computing environment 100 includes multiple hosts, such as host-A 110A . . . host-N 110N that may be inter-connected via a physical network 112, such as represented in FIG. 1 by interconnecting arrows between the physical network 112 and host-A 110A . . . host-N 110N. Examples of the physical network 112 can include a wired network, a wireless network, the Internet, or other network types and also combinations of different networks and network types. For simplicity of explanation, the various components and features of the hosts will be described hereinafter in the context of host-A 110A. Each of the other hosts can include substantially similar elements and features.

The host-A 110A includes suitable hardware-A 114A and virtualization software (e.g., hypervisor-A 116A) to support various virtual machines (VMs). For example, the host-A 110A supports VM1 118 . . . VMY 120, wherein Y (as well as N) is an integer greater than or equal to 1. In practice, the virtualized computing environment 100 may include any number of hosts (also known as "computing devices", "host computers", "host devices", "physical servers", "server systems", "physical machines," etc.), wherein each host may be supporting tens or hundreds of virtual machines. For the sake of simplicity, the details of only the single VM1 118 are shown and described herein.

VM1 118 may include a guest operating system (OS) 122 and one or more guest applications 124 (and their corresponding processes) that run on top of the guest operating system 122. In some embodiments, an application 124 may also be distributed amongst multiple VMs and/or hosts. VM1 118 may include still further other elements, such as a virtual disk, agents, engines, modules, and/or other elements 128 usable in connection with operating VM1 118.

The hypervisor-A 116A may be a software layer or component that supports the execution of multiple virtualized computing instances. The hypervisor-A 116A may run on top of a host operating system (not shown) of the host-A 110A or may run directly on hardware-A 114A. The hypervisor-A 116A maintains a mapping between underlying hardware-A 114A and virtual resources (depicted as virtual hardware 130) allocated to VM1 118 and the other VMs.

The hypervisor-A 116A of some implementations may include/execute one or more networking elements 140 that provide/support network virtualization functions for a network virtualization platform (such as the NSX product from VMware, Inc. of Palo Alto, California). For example, the networking elements 140 may include firewalls, logical or virtual routers and switches, gateways, etc., which may be distributed across multiple hosts. Such networking elements 140 may reside in the hypervisor-A 110A (such as depicted in FIG. 1 by way of example), and/or may reside elsewhere in the host-A 110A and other hosts, and/or may reside elsewhere in the virtualized computing environment 100 (e.g., at a dedicated standalone device or other network device, etc.).

The hypervisor-A 116A may include or may operate in cooperation with still further other elements 141 residing at the host-A 110A. Such other elements 141 may include drivers, agent(s), daemons, engines, libraries, and other types of modules/units/components that operate to support the functions of the host-A 110A and its VMs. According to various embodiments that will be described in further detail below, the other elements 141 may include a system health agent (SHA) and a trace library.

Hardware-A 114A includes suitable physical components, such as CPU(s) or processor(s) 132A; storage resources(s) 134A; and other hardware 136A such as memory (e.g., random access memory used by the processors 132A), physical network interface controllers (NICs) to provide network connection, storage controller(s) to access the storage resources(s) 134A, etc. Virtual resources (e.g., the virtual hardware 130) are allocated to each virtual machine to support a guest operating system (OS) and application(s) in the virtual machine, such as the guest OS 122 and the applications 124 in VM1 118. Corresponding to the hardware-A 114A, the virtual hardware 130 may include a virtual CPU, a virtual memory, a virtual disk, a virtual network interface controller (VNIC), etc.

Other device(s), system(s), network(s), etc. 152 may be connected to each of the host-A 110A . . . host-N 110N via the physical network 112. For example, in a distributed system embodied as a network virtualization platform, some hosts may run VMs that serve as endpoints; some hosts may operate virtual or logical switches and routers that support the communication of packets between devices in the distributed system; some hosts may operate as edge devices; etc.—such devices may communicate with each other within or between multiple networks (including clouds), all of which are collectively represented in FIG. 1 by the host-A 110A and other elements of the virtualized computing environment 100 being in communication with the other device(s), system(s), network(s), etc. 152 (shown in broken lines in FIG. 1) via the physical network 112.

A management server 142 or other management entity of one embodiment can take the form of a physical computer with functionality to manage or otherwise control the operation of host-A 110A . . . host-N 110N. In some embodiments, the functionality of the management server 142 can be implemented in a virtual appliance, for example in the form of a single-purpose VM that may be run on one of the hosts in a cluster or on a host that is not in the cluster of hosts. The management server 142 may be operable to collect usage data associated with the hosts and VMs, to configure and provision VMs, to activate or shut down VMs, to monitor health conditions and diagnose and remedy operational issues that pertain to health, and to perform other managerial tasks associated with the operation and use of the various elements in the virtualized computing environment 100.

The management server 142 may be a physical computer that provides a management console and other tools that are directly or remotely accessible to a system administrator or other user. The management server 142 may be communicatively coupled to host-A 110A . . . host-N 110N (and hence communicatively coupled to the virtual machines, hypervisors, hardware, etc.) via the physical network 112. The host-A 110A . . . host-N 110N may in turn be configured as a datacenter or cluster that is also managed by the management server 142. In some embodiments, the functionality of the management server 142 may be implemented in any of host-A 110A . . . host-N 110N, instead of being provided as a separate standalone device such as depicted in FIG. 1.

A user may operate a user device 146 to access, via the physical network 112, the functionality of VM1 118 . . . VMY 120 (including operating the applications 124), using a web client 148. The user device 146 can be in the form of a computer, including desktop computers and portable computers (such as laptops and smart phones). In one embodiment, the user may be an end user or other consumer that uses services/components of VMs (e.g., the application 124, etc.) and/or the services or other functionality provided by the cloud environment 152. The user may also be a system administrator that uses the web client 148 of the user device 146 to remotely communicate with the management server 142 or the cloud environment 152 via a management console for purposes of performing management operations.

Depending on various implementations, one or more of the physical network 112, the management server 142, the user device(s) 146, and the device(s), system(s), network(s), etc. 152 (or sub-components thereof) can comprise parts of the virtualized computing environment 100, or one or more of these elements can be external to the virtualized computing environment 100 and configured to be communicatively coupled to the virtualized computing environment 100.

Generally speaking, a trace can be performed for the virtualized computing environment 100, for example, for diagnosis purposes for tracking a test packet as the test packet traverses a datapath from an endpoint (e.g., an application running on a VM), through switches/routers, through an edge device, and through the device(s), system(s), network(s), etc. 152. Trace output data may include data received from the various devices/locations along the datapath, which indicate whether the packet was received, forwarded, dropped, delayed, corrupted, etc. These are but a few examples of trace output data that collectively may be exported for presentation to a user (such as a system administrator using the web client 148 at the user device 146), for purposes of presenting a trace (such as in graphical format) that can be examined to identify and diagnose issues as the test packet traversed through the datapath in the distributed system.

Trace Profiles and Tracing Runtime Data

Figure 2:
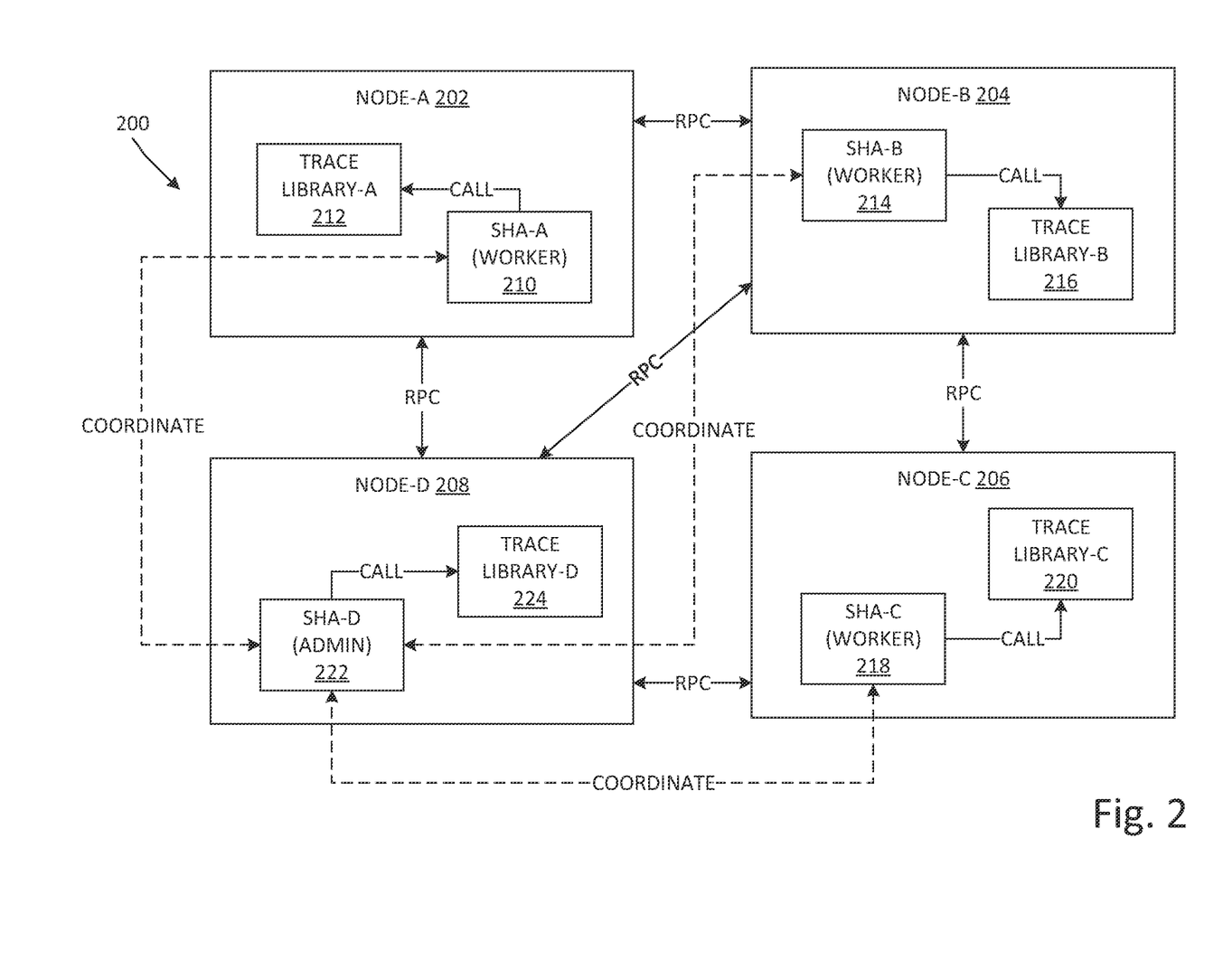
FIG. 2 is a schematic diagram of a coordinator system that may be used to perform tracing for the virtualized computing environment of FIG. 1.

FIG. 2 is a schematic diagram of a coordinator system 200 that may be used to for tracing in the virtualized computing environment 100 of FIG. 1. The coordinator system 200 is implemented in a plurality of nodes: node-A 202, node-B 204, node-C 206, and node-D 208 of a distributed system. For example, each of the nodes may be a host such as described above with respect to FIG. 1, with node-A 202 being a unified appliance (UA) or other network device, node-B being an edge device, and node-C and node-D being hosts on which hypervisors run VMs. These are just a few examples of the types of nodes that may be present in the distributed system.

Each node includes a respective SHA agent and trace library: SHA-A 210 and trace library-A 212 for node-A 202; SHA-B 214 and trace library-B 216 for node-B 204; SHA-C 218 and trace library-C 220 for node-C 206; and SHA-D 222 and trace library-D 224 for node-D 208. A SHA of various embodiments is a type of agent that collects runtime data (including health or other performance-related metric information) for its respective host, and provides the runtime data to the management server 142, to a third-party service, and/or to some other entity. In addition to local host-level runtime data pertaining to its respective host, a SHA may also be capable of collecting system-level runtime data associated with other hosts/devices in the distributed system. The SHAs of some embodiments may also be capable initiating/performing traces from its respective host, such as causing test packets to be sent from its respective host to other hosts/hops along a datapath in the distributed system, and then receiving and processing and exporting tracing output data that results from the traces.

A SHA may communicate with its respective trace library via an application programming interface (API) call (as depicted in FIG. 2) or via some other communication technique/protocol. Each of the nodes (e.g., components in each node) may communicate with other nodes (e.g., components of such other nodes) via remote procedure call (RPCs) such as shown in FIG. 2 or via some other communication technique/protocol. For instance, the SHAs may communicate with each other via RPCs.

In the example coordinator system 200 of FIG. 2, the SHA-D 222 at the node-D 208 operates as an administrator agent (e.g., a global coordinator administrator), while the SHA-A 210, the SHA-B 214, and the SHA-C 218 at the respective node-A 202, node-B-204, and node-C 206 operate as local worker agents. An election algorithm, a setting/designation by a user, or some other technique may be used to determine which SHA at a particular node will operate as the administrator agent. The election algorithm may select the administrator agent, for example, based on which host is least loaded and therefore has capacity to handle the added load associated with administrative/coordinator functions. The SHA-D 222 performing coordination with and for the other SHAs is represented in FIG. 2 in broken lines.

According to various embodiments, a trace profile is associated with one or more of the nodes in a distributed system, such as the nodes shown in the coordinator system 200 of FIG. 2. Separate trace profile(s) may be uniquely associated/applied to each individual node, multiple nodes may have the same or similar trace profile(s) associated/applied to it, and/or all nodes may have the same trace profile(s) globally associated/applied to them. A trace profile may be a file or other type of data structure that specifies at least one of content of a trace (e.g., volume of trace output data for a trace performed at a node), amount of traces (e.g., the number of traces performed at a node), error detail (e.g., level of detail provided by error messages from traces), source endpoint of datapath of a trace, destination endpoint of a datapath of a trace, test packet transmission protocol used by a trace, type of errors (e.g., exception, missing, dropped, or other types of errors) detected by or being diagnosed by traces, etc. These are but a few examples of the data/information that may be specified in a trace profile and that may be exported.

Trace profiles may be built/computed or otherwise generated based at least in part on collected traces that were performed previously. Trace profiles for each node may be generated by the respective local worker agent (e.g., each of the SHA-A 210, the SHA-B 214, and the SHA-C 218) and/or by the coordinator administrator (e.g., the SHA-D 222 using collected traces stored in the trace library-D 224). The trace profiles may then be adjusted (in a manner that will be described later below) as appropriate by the local worker agent and/or by the administrator agent, such as when runtime data indicates that an error has occurred or is likely to occur, and so the trace profile may require adjustment so as to obtain additional details regarding the error.

Trace profiles for each respective node may be stored in the trace library at the node of the local worker agents, and/or at the node of the administrator agent. The local worker agent at a host may locally adjust the trace profile at the host, and/or the administrator agent may remotely adjust and apply trace profiles for one or more nodes that the administrator agent is coordinating.

Figure 3:
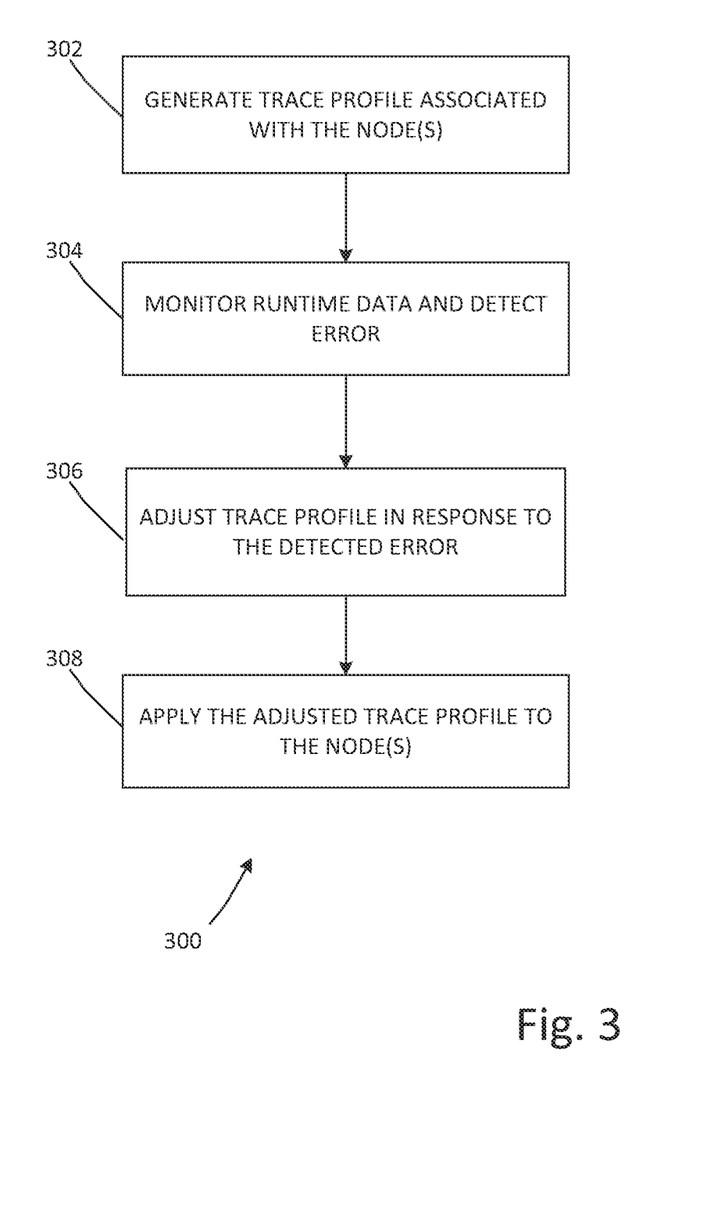
FIG. 3 shows a flowchart of an example method for dynamic tracing of runtime data.

FIG. 3 is a flowchart of an example method 300 for dynamic tracing of runtime data that may be performed in the virtualized computing environment 100 of FIG. 1. For instance, the method 300 may performed at least in part by the local worker agent(s) and administrator agents shown in FIG. 2.

The example method 300 may include one or more operations, functions, or actions illustrated by one or more blocks, such as blocks 302 to 308. The various blocks of the method 300 and/or of any other process(es) described herein may be combined into fewer blocks, divided into additional blocks, supplemented with further blocks, and/or eliminated based upon the desired implementation. In one embodiment, the operations of the method 300 and/or of any other process(es) described herein may be performed in a pipelined sequential manner. In other embodiments, some operations may be performed out-of-order, in parallel, etc.

The method 300 may begin at a block 302 ("GENERATE TRACE PROFILE ASSOCIATED WITH THE NODE(S)"), wherein a trace profile may be generated and associated with one or more of the nodes in the distributed system. The trace profile may be built based on traces performed previously by the respective node, may be a default trace profile, etc., all of which may be adjusted later based on runtime data or based on other reasons. The trace profiles may be stored in the trace library of each respective node.

The block 302 may be followed by a block 304 ("MONITOR RUNTIME DATA AND DETECT ERROR"), wherein the local worker agent at each respective node monitors runtime data at the host-level and/or at the system-level. Runtime data monitored at the block 304 may include throughput, latency, processor load, network bandwidth, memory capacity, and other performance-related metrics. An error (e.g., an exception or other type of error) may be detected by the local worker agent based on metrics collected by the local worker agent. The local worker agent may also itself initiate a trace and detect the error from the trace output data that results from the trace, for example by examining a workflow generated by a trace and detecting an error (such as an exception or missing step) in the workflow.

Also at the block 304, the local worker agent may also generate an alarm to notify an entity of the error, such as sending the alarm to the management server 142, to a third party, or to some other user or entity. The user/entity that received the alarm can thereafter take remedial action, such as further investigating the error, initiating further traces, opening a request or ticket to address the error, dumping data that may be invalid/unusable due to the error, and so forth.

The block 304 may be followed by a block 306 ("ADJUST TRACE PROFILE IN RESPONSE TO THE DETECTED ERROR"), wherein the trace profile may be adjusted, if appropriate or desired, in response to the detected error. In some situations, the local worker agent can handle some specific errors, without necessarily adjusting the corresponding trace profile, while other situations may make the adjustment of a trace profile practical or necessary. According to various embodiments, if an error such as latency is excessive (e.g., exceeds a preset or predefined value), the local worker agent may adjust the trace profile locally at the block 306, and then send the adjusted trace profile to the administrator agent. It is also possible for the local worker agent to report the error and/or other runtime data to the administrator agent (without the local worker agent necessarily adjusting the trace profile) and to also direct the runtime data or error or trace output data to a log file, and then the administrator agent can decide whether to adjust the trace profile and perform the adjustment at the block 306 based on the information received from the local worker agent.

At the block 306, an adjustment that the local worker agent may make to the trace profile is to increase the trace level in a workflow path in a daemon, so as to granularly increase the detail of the trace for the workflow.

With respect to a global adjustment of a trace profile that may be performed at the block 306, the administrator agent performs the global adjustment. For instance, in response to receiving the runtime data or error or adjusted trace profile from the local worker agent, the administrator agent can compute a result based on the information received from the local worker agent. For example, if latency has changed such that a preset/predefined latency value has been exceeded, the administrator agent can perform an algorithm to determine which part of an affected workflow requires further tracing and/or more detailed trace output data, for purposes of identifying the cause of the increased latency. The administrator agent may generate a trace workflow blueprint or make other changes to trace settings, including expanding or shrinking the trace profiles of the local worker agents at the nodes.

Expanding or shrinking the trace profiles may be used by the administrator agent to correspondingly increase or decrease the trace output data that is exported from traces performed by the local worker agents. In some embodiments, making such adjustments to the trace profiles may be based on a prediction of real-time throughput capability of each respective local worker agent.

The block 306 may be followed by a block 308 ("APPLY THE ADJUSTED TRACE PROFILE TO THE NODE(S)"), wherein the administrator agent applies the adjusted trace profiles to one or more of the nodes where the local worker agents reside. For instance, the administrator agent may send the adjusted trace profile to all of the nodes in the distributed system when the latency is the identified issue/error. The administrator agent may also send the adjusted profiles to individual nodes (e.g., less than all of the nodes) in the distributed system.

The local worker agents in turn receive the updated trace profile, and can then make API calls to their respective trace libraries so as to obtain more and detailed trace output data as specified in the updated trace profile, for exportation to a consumer (e.g., a system administrator or other entity) that is investigating the error. The more/detailed trace output data, if needed, may be used to assist in identifying the source(s) of the error and for other diagnostic/troubleshooting purposes. The more/detailed trace output data may be obtained from previously performed traces that involved the node(s) and/or the local worker agent at the nodes may perform further traces to obtain the more/detailed trace output data.

For situations when the administrator agent shrinks the trace profiles so as to reduce the volume/details of the trace output data, such reduction can facilitate throughput so as to improve traffic conditions in the distributed system, as well as reducing the need for processing/storage resources for handling excess data that may be less relevant to identifying and addressing the error.

Figure 4:
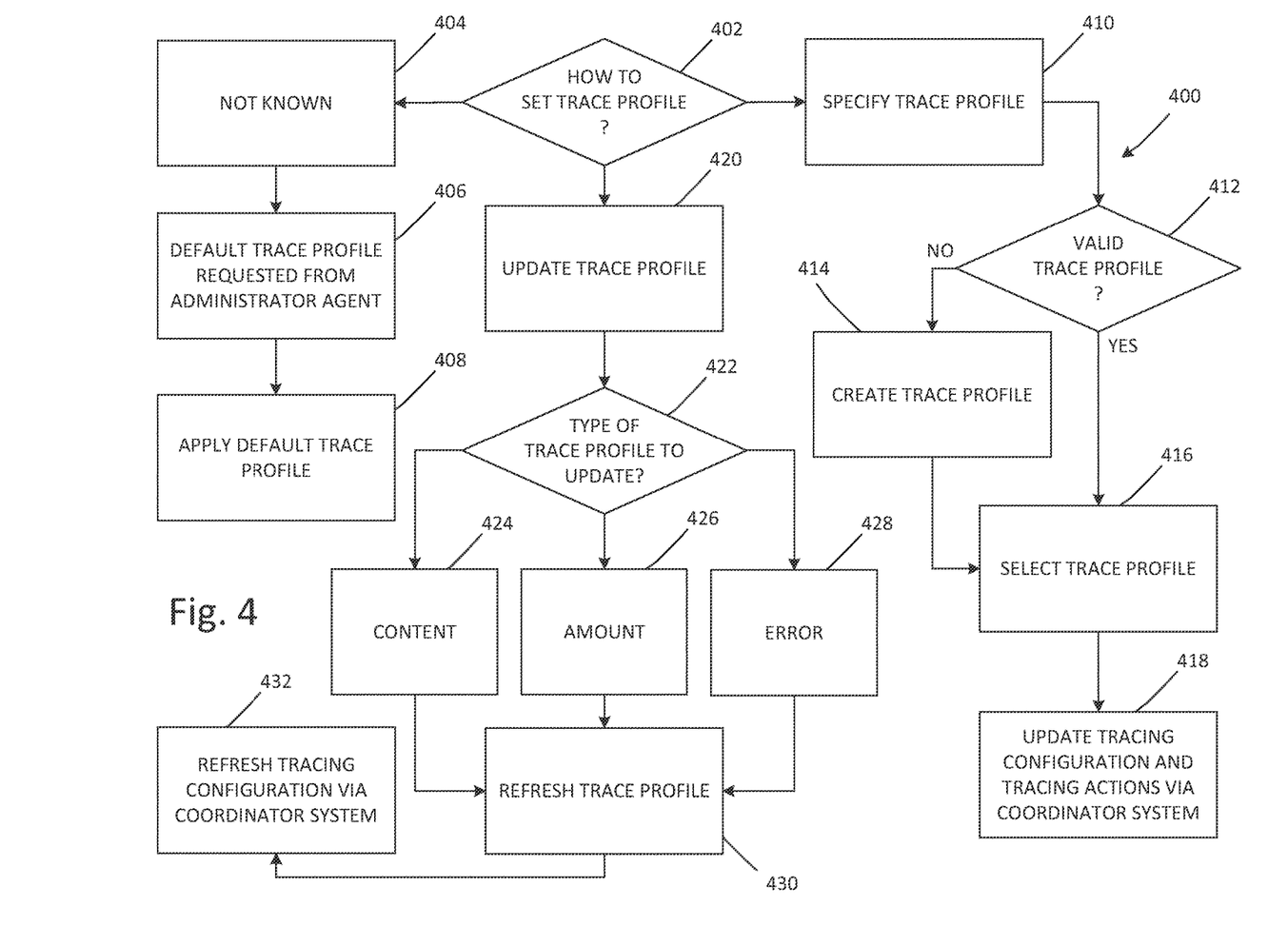
FIG. 4 shows a flowchart of an example method to provide trace profiles, which may be used in the coordinator system of FIG. 2 and in the method of FIG. 3.

FIG. 4 shows a flowchart of an example method 400 to provide trace profiles, which may be used in the coordinator system 200 of FIG. 2 and the method 300 of FIG. 3. The method 400 may be used, for example, to generate, update, and specify/select trace profiles. At least some of the operations of the method 400 may be performed by the administrator agent in cooperation with the local worker agent(s).

At a block 402 ("HOW TO SET TRACE PROFILE?"), the administrator agent decides whether a specific node (where a local worker agent resides) needs to have a trace profile set for it (e.g., the node is a newly added node or is some other node that is not yet associated with a trace profile).

If the local worker agent at the node does not know how to set a trace profile (e.g., "NOT KNOWN" at a block 404), then the administrator agent receives a request for a default trace profile from the local worder agent of the node, at a block 406 ("DEFAULT TRACE PROFILE REQUESTED FROM ADMINISTRATOR AGENT"). The default trace profile may be any suitable trace profile, such as a trace profile that is currently deployed for other nodes, a trace profile that has predefined settings, a trace profile with basic settings that will be completed during adjustment cycles, etc.

The block 406 may be followed by a block 408 ("APPLY DEFAULT TRACE PROFILE"), wherein the administrator agent associates/applies the default trace profile to the node and sends the default trace profile to the local worker agent.

Back at the block 402, an option is provided to enable the administrator agent and/or the local worker agent to specify a trace profile for the node ("SPECIFY TRACE PROFILE" at a block 410). If there is no valid trace profile ("NO" at a block 412), then a trace profile may be created at a block

414. For example, the trace profile may be created to specify the number of traces to be performed as well as other settings and related data for exportation.

If there is a valid trace profile ("YES" at the block 412) and also after completing the block 414, the trace profile is selected at a block 416 ("SELECT TRACE PROFILE"). The administrator agent then associates and applies the selected trace profile to the node, and sends the trace profile to the local worker agent at the node, so as to enable the local worker agent to update tracing configurations, tracing actions, etc., at a block 418 ("UPDATE TRACING CONFIGURATION AND TRACING ACTIONS VIA COORDINATOR SYSTEM").

Back at the block 402, an option is provided for an existing trace profile of a node to be updated/adjusted by the administrator agent and/or the local worker agent ("UPDATE TRACE PROFILE" at a block 420). According to some embodiments, this updating may be based on a prediction of the throughput of the node. For instance, the trace profile of a node may be expanded, if the node has the capacity to provide increased throughput for exporting a larger amount of trace output data. Conversely, the trace profile of a node may be shrunk, if the node has more limited capacity for exporting trace output data.

The administrator agent determines the type of information/setting in a trace profile that is to be updated, at a block 422 ("TYPE OF TRACE PROFILE TO UPDATE?"). For example: selection of "CONTENT" at a block 424 enables more trace output data to be exported for each trace; selection of "AMOUNT" at a block 426 enables more traces to be run/exported; and selection of "ERROR" at a block 428 enables more detailed error messages to be exported. One or more of these may be selected for updating. The trace profile is then refreshed at a block 430 ("REFRESH TRACE PROFILE"), based on the type of information/setting that was selected for updating.

The administrator agent may then apply the updates/adjustments to the trace profile and send the updated/adjusted trace profile to the node, at a block 432 ("REFRESH TRACING CONFIGURATION VIA COORDINATOR SYSTEM"), so as to enable the node to refresh/update the configuration settings for its traces and exportation.

Computing Device

The above examples can be implemented by hardware (including hardware logic circuitry), software or firmware or a combination thereof. The above examples may be implemented by any suitable computing device, computer system, etc. The computing device may include processor(s), memory unit(s) and physical NIC(s) that may communicate with each other via a communication bus, etc. The computing device may include a non-transitory computer-readable medium having stored thereon instructions or program code that, in response to execution by the processor, cause the processor to perform processes described herein with reference to FIGS. 1 to 4.

The techniques introduced above can be implemented in special-purpose hardwired circuitry, in software and/or firmware in conjunction with programmable circuitry, or in a combination thereof. Special-purpose hardwired circuitry may be in the form of, for example, one or more application-specific integrated circuits (ASICs), programmable logic devices (PLDs), field-programmable gate arrays (FPGAs), and others. The term "processor" is to be interpreted broadly to include a processing unit, ASIC, logic unit, or programmable gate array etc.

Although examples of the present disclosure refer to "virtual machines," it should be understood that a virtual machine running within a host is merely one example of a "virtualized computing instance" or "workload." A virtualized computing instance may represent an addressable data compute node or isolated user space instance. In practice, any suitable technology may be used to provide isolated user space instances, not just hardware virtualization. Other virtualized computing instances may include containers (e.g., running on top of a host operating system without the need for a hypervisor or separate operating system; or implemented as an operating system level virtualization), virtual private servers, client computers, etc. The virtual machines may also be complete computation environments, containing virtual equivalents of the hardware and system software components of a physical computing system. Moreover, some embodiments may be implemented in other types of computing environments (which may not necessarily involve a virtualized computing environment and/or other type of distributed system), wherein it would be beneficial to improve the effectiveness and efficiency of traces.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood that each function and/or operation within such block diagrams, flowcharts, or examples can be implemented, individually and/or collectively, by a wide range of hardware, software, firmware, or any combination thereof.

Some aspects of the embodiments disclosed herein, in whole or in part, can be equivalently implemented in integrated circuits, as one or more computer programs running on one or more computers (e.g., as one or more programs running on one or more computing systems), as one or more programs running on one or more processors (e.g., as one or more programs running on one or more microprocessors), as firmware, or as virtually any combination thereof, and that designing the circuitry and/or writing the code for the software and or firmware are possible in light of this disclosure.

Software and/or other computer-readable instruction to implement the techniques introduced here may be stored on a non-transitory computer-readable storage medium and may be executed by one or more general-purpose or special-purpose programmable microprocessors. A "computer-readable storage medium", as the term is used herein, includes any mechanism that provides (i.e., stores and/or transmits) information in a form accessible by a machine (e.g., a computer, network device, personal digital assistant (PDA), mobile device, manufacturing tool, any device with a set of one or more processors, etc.). A computer-readable storage medium may include recordable/non recordable media (e.g., read-only memory (ROM), random access memory (RAM), magnetic disk or optical storage media, flash memory devices, etc.).

The drawings are only illustrations of an example, wherein the units or procedure shown in the drawings are not necessarily essential for implementing the present disclosure. The units in the device in the examples can be arranged in the device in the examples as described, or can be alternatively located in one or more devices different from that in the examples. The units in the examples described can be combined into one module or further divided into a plurality of sub-units.

We claim:

1. A method for dynamic tracing of runtime data in a distributed system, the method comprising:
   associating a trace profile to at least one node of a plurality of nodes in the distributed system, wherein each of the nodes includes a local worker agent, and wherein an administrator agent coordinates trace profiles for the plurality of nodes;
   detecting, by the local worker agent of the at least one node, an error that pertains to runtime data monitored by the local worker agent;
   in response to the detected error, updating, by the local worker agent of the at least one node, the trace profile;
   sending, by the local worker agent of the at least one node, the updated trace profile to the administrator agent; and
   after receiving the updated trace profile at the administrator agent, applying, by the administrator agent, the updated trace profile to at least some of the plurality of nodes so as to increase or decrease trace output data for traces that are performed by the at least some of the nodes.

2. The method of claim 1, wherein applying the updated trace profile to the at least some of the nodes comprises applying the updated trace profile to all of the plurality of nodes.

3. The method of claim 1, wherein the trace profile specifies at least one of content of trace output data for a trace, number of traces, and error detail provided the trace.

4. The method of claim 1, further comprising performing tracing, by the at least some of the plurality of nodes, based on the updated trace profile applied by the administrator agent.

5. The method of claim 1, wherein the administrator agent resides on a particular node of the plurality of nodes, and wherein the method further comprises selecting the administrator agent based on an election algorithm.

6. A non-transitory computer-readable medium having instructions stored thereon, which in response to execution by one or more processors, cause the one or more processors of a host to perform or control performance of a method for dynamic tracing of runtime data in a distributed system, wherein the method comprises:
   associating a trace profile to at least one node of a plurality of nodes in the distributed system, wherein each of the nodes includes a local worker agent, and wherein an administrator agent coordinates trace profiles for the plurality of nodes;
   detecting, by the local worker agent of the at least one node, an error that pertains to runtime data monitored by the local worker agent;
   in response to the detected error, updating, by the local worker agent of the at least one node, the trace profile;
   sending, by the local worker agent of the at least one node, the updated trace profile to the administrator agent; and
   after receiving the updated trace profile at the administrator agent, applying, by the administrator agent, the updated trace profile to at least some of the plurality of nodes so as to increase or decrease trace output data for traces that are performed by the at least some of the nodes.

7. The non-transitory computer-readable medium of claim 6, wherein applying the updated trace profile to the at least some of the nodes comprises applying the updated trace profile to all of the plurality of nodes.

8. The non-transitory computer-readable medium of claim 6, wherein the trace profile specifies at least one of content of trace output data for a trace, number of traces, and error detail provided the trace.

9. The non-transitory computer-readable medium of claim 6, wherein the method further comprises performing tracing, by the at least some of the plurality of nodes, based on the updated trace profile applied by the administrator agent.

10. The non-transitory computer-readable medium of claim 6, wherein the administrator agent resides on a particular node of the plurality of nodes, and wherein the method further comprises selecting the administrator agent based on an election algorithm.

11. A coordinator system, comprising:
    one or more processors; and
    a non-transitory computer-readable medium coupled to the one or more processors, and having instructions stored thereon, which in response to execution by the one or more processors, cause the one or more processors to perform or control performance of operations for dynamic tracing of runtime data in a distributed system, wherein the operations include:
      associate a trace profile to at least one node of a plurality of nodes in the distributed system, wherein each of the nodes includes a local worker agent, and wherein an administrator agent coordinates trace profiles for the plurality of nodes;
      detect, by the local worker agent of the at least one node, an error that pertains to runtime data monitored by the local worker agent;
      in response to the detected error, update, by the local worker agent of the at least one node, the trace profile;
      send, by the local worker agent of the at least one node, the updated trace profile to the administrator agent; and
      after receiving the updated trace profile at the administrator agent, apply, by the administrator agent, the updated trace profile to at least some of the plurality of nodes so as to increase or decrease trace output data for traces that are performed by the at least some of the nodes.

12. The coordinator system of claim 11, wherein the operations to apply the updated trace profile to the at least some of the nodes includes operations to apply the updated trace profile to all of the plurality of nodes.

13. The coordinator system of claim 11, wherein the trace profile specifies at least one of content of trace output data for a trace, number of traces, and error detail provided the trace.

14. The coordinator system of claim 11, wherein the at least some of the plurality of nodes performs tracing based on the updated trace profile applied by the administrator agent.

15. The coordinator system of claim 11, wherein the administrator agent resides on a particular node of the plurality of nodes, and wherein the administrator agent is selected based on an election algorithm.

* * * * *